United States Patent [19]

Stanish

[11] Patent Number: 4,685,242

[45] Date of Patent: Aug. 11, 1987

[54] DEVICE FOR CUTTING OR CHOPPING LARGE PIECES OF BAIT INTO SMALLER ONES WHILE IMMERSED IN WATER

[76] Inventor: Ronald J. Stanish, 537 N. Rainbow Dr., Hollywood, Fla. 33021

[21] Appl. No.: 902,762

[22] Filed: Sep. 2, 1986

[51] Int. Cl.⁴ ............................................. A01K 97/02
[52] U.S. Cl. .................................. 43/44.99; 43/42.06
[58] Field of Search .................. 43/4, 41, 42.06, 44.99

[56] References Cited

U.S. PATENT DOCUMENTS

| | | | |
|---|---|---|---|
| 2,719,382 | 10/1955 | Schachte | 43/44.99 |
| 3,092,925 | 6/1963 | Ho et al. | 43/42.06 |
| 4,138,794 | 2/1979 | Chiodini | 43/44.99 |
| 4,603,502 | 8/1986 | MacDonald | 43/44.99 |

FOREIGN PATENT DOCUMENTS 1561842   3/1980   United Kingdom .............. 43/44.99

*Primary Examiner*—M. Jordan

[57] ABSTRACT

A device for chopping or mashing fish into chum or bait size pieces while the device is immersed in water at variable depths which operates by wave action or swells acting on a cutter slidably housed inside a perforated container and at one end being attached to a boat or other floating object and at the other having a weight. The perforated container has removable end caps and a stabilizer affixed to one end cap for stabilization in water. A cutting or chopping operation is effected by wave or swell action causing the boat or floating object to rise in the water causing the cutter to rise inside the stabilized container containing large pieces of fish until the cutter impacts fish against an end cap of the container. As the wave or swell recedes, the boat or floating object drops in the water and the weight affixed to the other end of the cutter causes the cutter to fall inside the stabilized container containing large pieces of fish until the cutter impacts fish against an end cap of the container. As a result of the cutting or chopping action, chum or small pieces of bait are washed out through the holes in the container thereby attracting game fish. By adjusting the length of the line to the boat or floating object, the device can be operated at variable depths and used to bring game fish nearer the surface.

6 Claims, 6 Drawing Figures

Fig. 6
Fig. 7
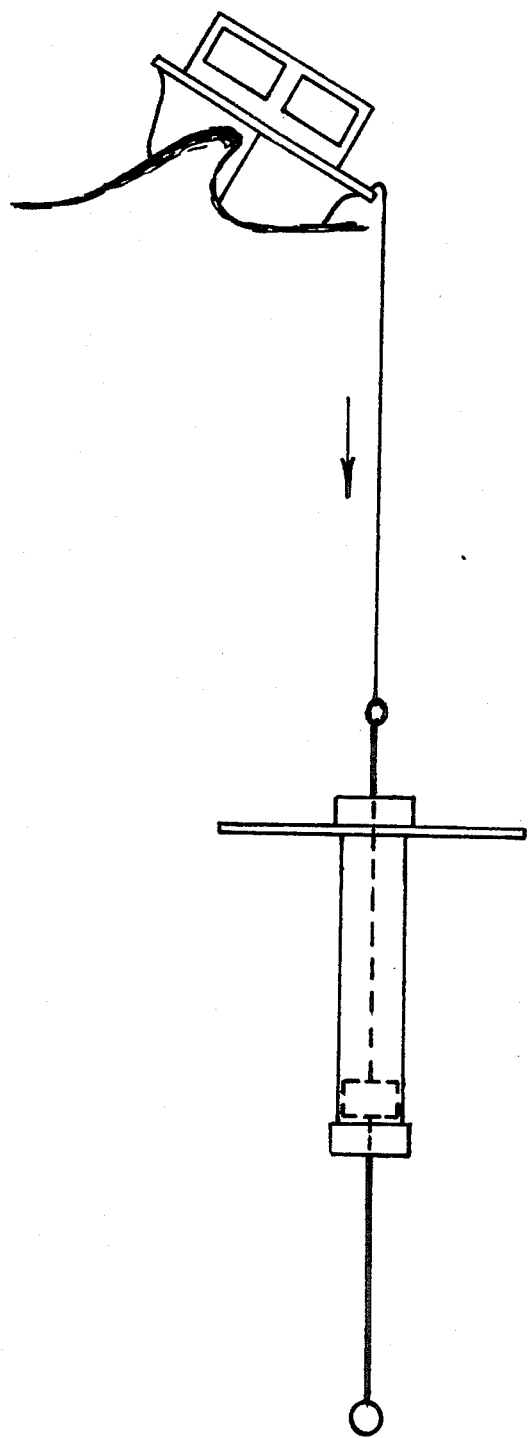
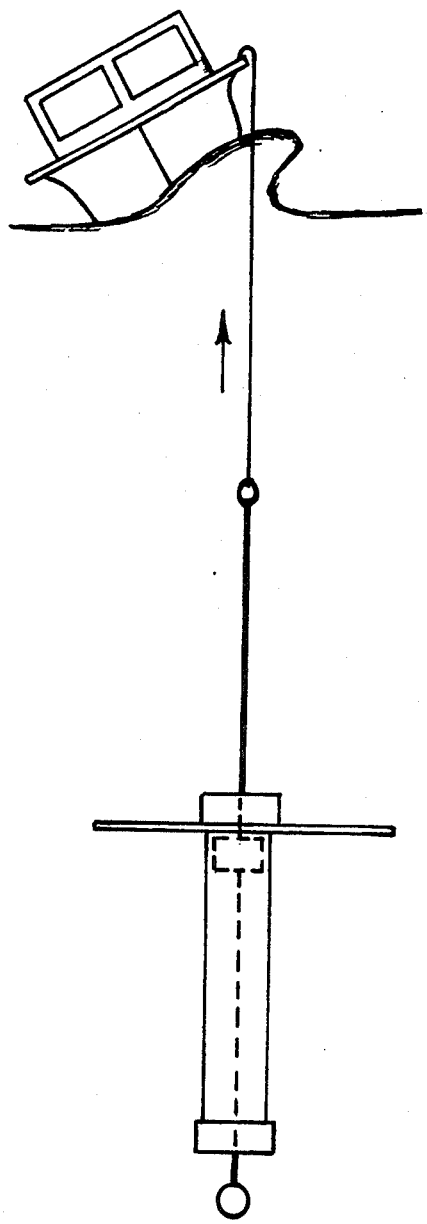

DEVICE FOR CUTTING OR CHOPPING LARGE PIECES OF BAIT INTO SMALLER ONES WHILE IMMERSED IN WATER

FIELD OF THE INVENTION

The invention relates to a waterborne and water powered device for chopping or cutting bait having a perforated container, movable cutter, the cutting edges of which operate against the end members of the container and a stabilizer affixed to one end member.

BACKGROUND OF THE INVENTION

Fishing requires bait. Chum, a form of bait, is an integral part of a fisherman's requirements. Chum can be purchased in loose pieces or frozen blocks. The purpose underlying the invention is to enable fisherman to provide their own chum from available scraps or discarded fish at the point where fishing is being done. Utilizing the invention, a fisherman eliminates the mess and risk of an accident while hand cutting bait on board a rocking boat and saves money by making use of avaiable discarded fish and scraps.

SUMMARY OF THE INVENTION

The invention enables one to provide cut bait at the point of fishing through the utilization of wave motion acting on a movable cutter encased in a perforated container stabilized in water. The cutter is affixed to two cables. The first cable, the loose end of which passes through one end of the container, designated the top end and connects with a line to a boat or other floating object; the second cable, the loose end of which passes out through the other end of the perforated container, designated bottom end, and connects with a weight. Sufficient cable length must be allowed such that the cutter may travel freely the distance between the top and bottom ends of the perforated container. In use one end of the container is removed and fish scraps or large pieces of bait are placed in the container and the end cap replaced. The device is then lowered into the water at a desired depth. As a wave or swell causes a boat or other floating object to rise in the water the cutter is pulled upward against the top end of the perforated container stabilized in water, thereby chopping or mashing bait into small pieces. As the wave or swell recedes and the boat or floating object lowers in the water, the weight affixed to the bottom end of one cable cause the cutter to be pulled downward against the bottom end of the perforated container causing the bait to be chopped or mashed into small pieces. The small chopped pieces of bait then are washed out through the holes in the perforated container by water action thereby attracting game fish. By lengthening the line from the boat or floating object, the invention can be operated at any depth and used to bring fish nearer the surface by slowly raising the device for more effective fishing.

BRIEF DESCRIPTION OF THE DRAWINGS

FIG. 6 shows how the device embodying the invention operates in water.

DETAILED DESCRIPTION OF THE DRAWINGS

Figure 1:
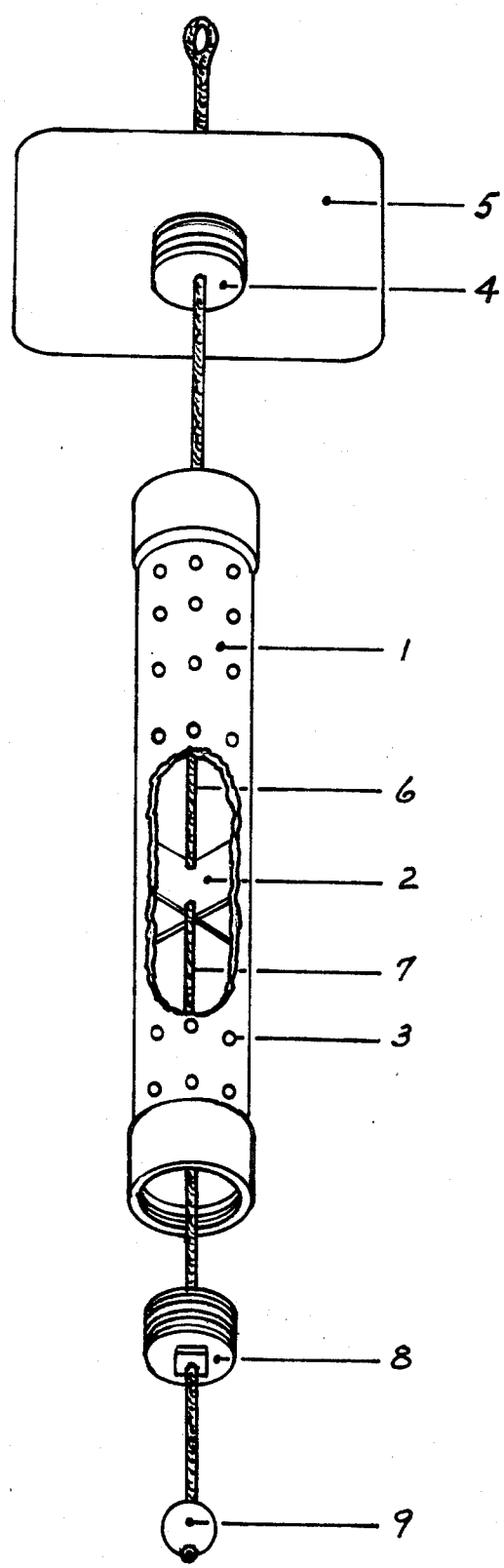
FIG. 1 shows a prospective view of a device embodying the invention.

The device for chopping or mashing bait as shown in FIG. 1 has a perforated container 1 of sufficient size to accept large pieces of fish and proper shape compatible with the type of cutter 2 used; holes 3 in the container 1 to allow the chopped pieces of bait to be washed out of container 1; caps 4 & 8 close the container at either end are removable to permit the fish to be placed in the container, allow for each cleaning to the container 1 and are the surfaces upon which the cutter 2 acts in chopping, cutting or mashing fish into chum or small bait; a stabilizer 5 affixed to a cap 4 or 8 offers resistance in water to container 1 such that the cutter 2 moves relative to container 1; a cable 6 affixed to cutter 2 and acting co-axially with cutter 2 passes through one cap 4 designated top cap, to a line to a boat or other floating object and a second cable 7 affixed to cutter 2 and having one end passes through end cap 8, designated bottom cap, and connects to a weight 9; cables 6 & 7 must be of sufficient length and positioned such that cutter 2 affixed may act freely inside container 1 and upon caps 4 & 8.

Figure 2:
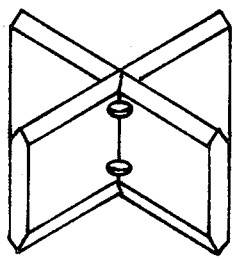
FIG. 2 shows a prospective view of the cutting blade.

The cutter as shown in FIG. 2 has blades sharpened on both ends and is rigidly fixed in an X or cross shape and has holes for attachment to cables 6 & 7 as shown in FIG. 1.

Figure 3:
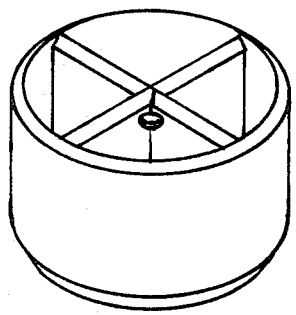
FIG. 3 shows a prospective view of the cutting blade with additional cutting surface attached.

The cutter as shown in FIG. 3 is the same as shown in FIG. 2 having in addition a band for additional cutting or chopping sharpened on both sides and rigidly fixed around the non-cutting edges of the cutter as shown in FIG. 2.

Figure 4:
FIG. 4 shows a serrated rod that may be used in place of the cable shown in FIG. 1.

The serrated rod as shown in FIG. 4 may be substituted or used in place of cables 6 & 7. Serrations in the rod may vary in size, shape and location along the rod and the rod may be made of metal or other similarly strong material. As the rod moves up and down in container 1, the serrated rod will shred the large pieces of bait into small ones which will then pass through the holes 3 in container 1 and attract game fish.

Figure 5:
FIG. 5 shows chains that may be used in place of the cables as shown in FIG. 1.

Chain or chains as shown in FIG. 5 may also substitute for cables 6 & 7 shown in FIG. 1 and have the additional effect of shredding bait into chum or small pieces of bait fish by virtue of the links in the chain repeatedly mashing the large pieces of fish inside container 1.

What is claimed is:

1. A waterpowered apparatus for chopping and dispensing bait while in water at variable depths of water comprising: a perforated container; removable end caps to said container; means for cutting affixed to cables slidably housed inside said container; one said cable having a free end passing through one said end cap, designated top end cap for connection to a line to a boat or other floating object, a second or bottom end cable having a free end passing through one said end cap designated bottom end cap for connection to a weight; said cables being of sufficient length and positioned with said cutting means inside said container such that said cutting means may act freely inside said container and upon said end caps; a stabilizer rigidly affixed to one said end cap.

2. The apparatus according to claim 1 wherein said perforated container is a cylinder having threads at both ends for attachment of said end caps and said cylinder being slightly larger in diameter than said cutting means.

3. The apparatus according to claim 1 wherein said means for cutting is X or cross-shaped and double edged for cutting in two directions.

4. The apparatus according to claim 3 wherein said means for cutting has in addition a band for additional cutting or chopping sharpened on both sides and rigidly fixed around the non-cutting edges of said means for cutting.

5. The apparatus according to claim 1 wherein said cables are replaced with serrated rods.

6. The apparatus according to claim 1 wherein said cables are replaced with chains.

* * * * *